United States Patent
Rein et al.

(10) Patent No.: US 11,405,106 B2
(45) Date of Patent: Aug. 2, 2022

(54) SETUP FOR RECEIVING AN OPTICAL DATA SIGNAL

(71) Applicant: Deutsches Zentrum für Luft- und Raumfahrt e.V., Cologne (DE)

(72) Inventors: Fabian Rein, Olching (DE); Juraj Poliak, Munich (DE); Ramon Mata Calvo, Munich (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 0 days.

(21) Appl. No.: 17/421,581

(22) PCT Filed: Jan. 10, 2020

(86) PCT No.: PCT/EP2020/050526
§ 371 (c)(1),
(2) Date: Jul. 8, 2021

(87) PCT Pub. No.: WO2020/144319
PCT Pub. Date: Jul. 16, 2020

(65) Prior Publication Data
US 2022/0085885 A1   Mar. 17, 2022

(30) Foreign Application Priority Data

Jan. 10, 2019 (DE) .......................... 102019200225.0

(51) Int. Cl.
*H04B 10/118* (2013.01)
*H04B 10/071* (2013.01)
(Continued)

(52) U.S. Cl.
CPC ......... *H04B 10/118* (2013.01); *H04B 10/071* (2013.01); *H04B 10/2589* (2020.05); *H04B 10/40* (2013.01)

(58) Field of Classification Search
None
See application file for complete search history.

(56) References Cited

U.S. PATENT DOCUMENTS 4,635,299 A * 1/1987 MacGovern ....... H04B 10/1125
356/153
5,930,045 A * 7/1999 Shirasaki ............. G02B 6/4215
359/857

(Continued)

FOREIGN PATENT DOCUMENTS

CN         103311790 B    3/2016
EP            1130810 A2   9/2001
JP         2006023626 A    1/2006

*Primary Examiner* — Jai M Lee
(74) *Attorney, Agent, or Firm* — The Webb Law Firm

(57) ABSTRACT

The disclosure relates to a setup for receiving an optical data signal having input optics for receiving the signal. An optical receiving fiber with an end facet is provided, which can be injected into the optical receiving fiber by an optical collimation system. A detector for detecting the optical data content is connected to the optical receiving fiber. A receive calibration source is provided, which is connected to the optical receiving fiber by a circulator. An insertable retroreflector is provided in the light path for adjusting the setup into the light path so that light from the receive calibration source is reflected and focused by the optical collimation system onto the end facet of the receiving fiber. The distance in the z-direction between the optical collimation system and the end facet of the receiving fiber is adjusted by the power of the light from the receive calibration source detected.

15 Claims, 2 Drawing Sheets

(51) Int. Cl.
*H04B 10/25* (2013.01)
*H04B 10/40* (2013.01)

(56) References Cited

U.S. PATENT DOCUMENTS

| | | | |
|---|---|---|---|
| 6,381,055 B1 * | 4/2002 | Javitt | H04B 10/1123 398/131 |
| 6,535,314 B1 * | 3/2003 | Mendenhall | H04B 10/118 398/121 |
| 7,224,905 B2 * | 5/2007 | Ruggiero | H04B 10/1121 398/119 |
| 8,301,032 B2 * | 10/2012 | Majumdar | H04B 10/1123 398/131 |
| 2006/0024061 A1 | 2/2006 | Wirth et al. | |

* cited by examiner

SETUP FOR RECEIVING AN OPTICAL DATA SIGNAL

CROSS-REFERENCE TO RELATED APPLICATIONS

This application is the United States national phase of International Application No. PCT/EP2020/050526 filed Jan. 10, 2020, and claims priority to German Patent Application No. 102019200225.0 filed Jan. 10, 2019, the disclosures of which are hereby incorporated by reference in their entirety.

BACKGROUND OF THE INVENTION

Field of the Invention

The present disclosure relates to a setup for receiving an optical free-space data signal. Furthermore, the present disclosure relates to a data transfer system for transferring an optical free-space data signal from a transmitter to a receiver. Moreover, the present disclosure relates to a method for adjusting such a setup or data transfer system.

Description of Related Art

When optical data signals are transferred through the atmosphere, signal interferences occur due to refraction index turbulence of the atmosphere. In the optical free-space communication in-coupling into a single-mode fiber is intended such that fiber-based telecommunication components can be used. Due to the phase interferences of the channel strong losses in the downlink from satellites or aircraft occur when the signal is coupled into the single-mode fiber. If the receiving aperture is very small, the phase interference is of a low order (where only the Zernike modes 1, 2 and 3 are dominant) and an angle error on the focal plane (the so-called x, y-tilt) is obtained. When the telescope aperture is larger than the size of phase interference, phase interferences of higher orders are obtained (higher Zernike modes are not negligible here). Several intensity spots are formed on the focal plane, whose position and size vary on a millisecond scale.

In the uplink the phase interferences occur near the transmitter since the beam propagates only on the first kilometers through the atmosphere. Subsequently, the beam expands nearly unaffectedly in the outer space according to the divergence. This results in the receiving aperture always being very small as compared to the size of the phase interference. The interference occurs at the receiver mainly as an angle error and intensity variation corresponding to a phase interference of low order.

In both situations it is required to correct the angle interferences, i.e. the phase interferences of low order, such that the received light is coupled into the optical receiving fiber in the best manner possible. Since the in-coupled power in the optical fiber does not allow for a conclusion with regard to an angle error (not enough degrees of freedom), an external tracking sensor is required. The latter is normally located in a parallel branched-off optical path and must be exactly pointed with respect to the optical fiber. Here, the tracking sensor is a photosensitive sensor which is arranged behind a focusing lens (sensor focusing lens). An input angle error is hence measured as a lateral offset at the sensor. The distance between the sensor focusing lens and the sensor allows for calculation of the input angle. For realizing an efficient coupling into the fiber, the correct distance between the optical fiber and the focusing lens (hereinafter referred to as receiving collimation optics) is crucial.

In the optical satellite communication both a receiving system and a transmitting system are required in each participant. On the one hand, this enables a bidirectional communication. On the other hand, a position reference (a so-called beacon) is always required for realizing precise pointing of the communication partners even in the case of very small transmitting beam lobes. Since in the satellite communication always two moving communication partners are involved and the distances are very large, this position reference/the transmitting beam must always be radiated at a point-ahead angle for impinging on the communication partner. For adjusting a defined point-ahead angle, this transmission system must, however, be pointed to the receiving system during adjustment.

The setting of all elements for coupling into the fiber is critical in terms of achieving an optimum in-coupling efficiency.

An optical communication of satellites and aircraft needs an adaptive optics and a single-mode fiber in-coupling when it is intended to increase the data throughput during data transfer. This enables an optical preamplification and use of the dense wavelength division multiplexing (DWDM) technology.

SUMMARY OF THE INVENTION

It is an object of the present disclosure to provide a setup for receiving an optical data signal, which can be reliably adjusted for an optimum reception of the optical data signal. In addition, it is an object of the present disclosure to provide a data transfer system corresponding to such a setup as well as a method for adjusting such a setup.

The setup for receiving an optical data signal according to the disclosure comprises an input optics for receiving an optical data signal. In addition, the setup comprises an optical receiving fiber having an end facet, wherein the optical data signal is configured to be coupled into the optical receiving fiber by means of the collimations optics. The optical receiving fiber has connected thereto a detector for detection of the optical data signal and conversion into an electric signal. The use of a fiber-based detector allows for the use of standard telecommunication systems for detection of the optical data signal. In addition, according to the disclosure, a receiving calibration source is provided. Here, the receiving calibration source is in particular also fiber-based and connected to the optical receiving fiber by means of a circulator. Light of the receiving calibration source leaves the receiving fiber at its end facet and is collimated by the receiving collimation optics. In addition, according to the disclosure, a retroreflector configured to be inserted into the beam path is provided and is insertable into the beam path for adjustment of the setup such that the light of the receiving calibration source is reflected back and focused onto the end facet of the receiving fiber by means of the receiving collimation optics. Retroreflectors have the property of collinearly reflecting back incoming light.

According to the disclosure, the distance in the z-direction between the receiving collimation optics and the end facet of the receiving fiber is variable. If the distance between the receiving collimation optics and the end facet of the receiving fiber is too large or too small, incoming light of the optical data signal passing through the input optics in a collimated manner is not optimally focused onto the end facet of the receiving fiber, whereby in-coupling losses occur during coupling of the optical data signal into the optical receiving fiber. Thus it is necessary to optimally adjust the distance in the z-direction, i.e. the distance along the optical axis. For this purpose, the light of the receiving calibration source is used. The light of the receiving calibration source leaves the end facet of the receiving fiber and is collimated by the receiving collimation optics. If, however, the distance in the z-direction between the receiving collimation optics and the end facet of the receiving fiber is not optimal, the light of the receiving calibration source is not completely collimated behind the receiving collimation optics and is thus slightly divergent or convergent. The divergence or convergence is maintained during the back-reflection by the retroreflector such that slightly divergent or convergent light impinges onto the receiving collimation optics. However, a divergent or convergent light beam leads to displacement of the focal point such that in the case of a non-optimum distance between the receiving collimation optics and the end facet of the receiving fiber the light of the receiving calibration source has its focal point behind or in front of the end facet of the receiving fiber in the z-direction. Thereby, however, the light of the receiving calibration source is inadequately coupled into the receiving fiber. The detector thus detects a small power. In particular, here, the end facet of the receiving fiber and the receiving collimation optics lie on a common optical axis which preferably is essentially defined and does not vary. By adapting the distance between the receiving collimation optics and the end facet of the receiving fiber it can be ensured that the light of the receiving calibration source is completely collimated behind the receiving collimation optics. This collimated light is then reflected back by the retroreflector, focused again by the receiving collimation optics, wherein the focal point lies exactly on the end facet of the receiving fiber. Thereby, the received power of the detector is maximized. Thus the optimum distance in the z-direction between the receiving collimation optics and the end facet of the fiber can be determined in a simple manner. For operating the setup for receiving an optical data signal the retroreflector is then removed out of the beam path. An incoming optical data signal traveling into the setup through the input optics comprises essentially collimated light in particular due to the large distance between the transmitter and the receiver when used as a satellite uplink such that this collimated light is optimally focused onto the end facet of the receiving fiber, whereby an effective coupling of the received optical data signal into the receiving fiber and thus into the detector is enabled. The optimum distance determined by means of the receiving calibration source is thus also applicable to the operation of the setup for the incoming optical data signal. Thereby, a simple, reliable and rapid adjustment can be performed.

Preferably, a four-quadrant-sensor (4QD) is provided, wherein during adjustment of the setup, with the retroreflector inserted into the beam path, light of the receiving calibration source is focused onto the four-quadrant-sensor by means of an optics. Thus the position on the four-quadrant sensor depends on the lateral position of the end facet of the receiving fiber. Here, the four-quadrant sensor is movable in a lateral plane, i.e. perpendicular to the optical axis, which corresponds to a relative lateral movement between the four-quadrant sensor and the end facet of the receiving fiber. Light of the receiving calibration source leaves the end facet of the receiving fiber and is collimated by the receiving collimation optics and then reflected back by the retroreflector. A portion of the back-reflected light of the receiving calibration source is then focused onto the four-quadrant sensor by means of the optics. Displacement of the four-quadrant sensor leads to displacement of the focal point relative to the sensor center of the four-quadrant sensor. Only in the case of an optimum position of the four-quadrant sensor relative to the end facet of the fiber this results in a central position of the light of the receiving calibration source on the four-quadrant sensor. Thus also the relative position of the end facet relative to the four-quadrant sensor in the x- and the y-position—perpendicular to the optical axis—is adjustable in a simple manner for ensuring an optimum coupling of the optical data signal into the receiving fiber during the operation of the setup. Here, the x/y-position of the end facet is in particular not varied and remains centrally on the optical axis of the receiving collimation optics, whereby the influence of optical inaccuracies of the receiving collimation optics is reduced.

Preferably, a tip/tilt mirror or a fast steering mirror (FSM) for compensating for an angle error of the received optical data signal is provided. Here, the signal of the four-quadrant sensor is used for controlling the movement of the tip/tilt mirror by means of a control loop. Thus the four-quadrant sensor supplies a signal by adjustment, which signal allows for the optical input signal to be optimally controlled to the position of the end facet of the receiving fiber.

Preferably, a position sensor—a so-called PSD (position sensitive device), for example—is provided, wherein during the adjustment, with the retroreflector inserted into the beam path, light of the receiving calibration source is focused onto this position sensor by means of an optics for determining the lateral position of the end facet of the receiving fiber relative to the position sensor. This position sensor can be statically built into the system and its position cannot be varied. The position information of the sensor measured during the adjustment serves as a reference for rough pointing during operation. Here, the position sensor can have a larger surface at a smaller position resolution than that of the four-quadrant sensor. In particular, the position sensor can thereby compensate for the disadvantages of the very much nonlinear response behavior of the four-quadrant sensor. With the aid of this position sensor rough pointing of the setup to its communication partner or a transmitter can be performed.

Preferably, a transmitting laser is provided such that the setup is configured for bidirectional transmission and reception of an optical signal. Here, the transmitting laser is in particular connected to an optical transmitting fiber. The use of a fiber-based transmitting laser allows for use of standard telecommunication lasers.

Preferably, a transmitting calibration source is provided. The transmitting calibration source can be either the transmitting laser itself which is configured to be controlled such that the power of the transmitting laser essentially corresponds to the power of the receiving calibration source. Thereby, it is ensured that the light from the transmitting laser acting as the transmitting calibration source, which is received by the four-quadrant sensor or the detector does not oversaturate them. Alternatively, an additional transmitting calibration source with a corresponding power can be provided which is combined with the transmitting laser via an optical high-power switch (HPS), for example, wherein the components of the high-power switch and the transmitting calibration source are connected to the transmitting fiber. The light of the transmitting calibration source is also reflected at the retroreflector during the adjustment with the retroreflector inserted into the beam path. The light of the transmitting calibration source reflected back by the retroreflector is coupled into the receiving fiber via the receiving collimation optics and then detected by the detector. Here, the distance between an end facet of the transmitting fiber and a transmitting collimation optics for coupling the optical data signal of the transmitting laser out of the transmitting fiber is variable in the z-direction. Here, the distance between the end facet of the transmitting fiber and the corresponding transmitting collimation optics is adapted depending on the power detected by the detector. In particular, here, the end facet of the transmitting fiber and the transmitting collimation optics lie on a common optical axis which is preferably essentially defined and does not vary. If the distance between the end facet of the transmitting fiber and the corresponding transmitting collimation optics is not optimal, the light of the transmitting calibration source is not completely collimated behind the transmitting collimation optics but has a slight divergence or convergence. This slightly divergent or convergent light of the transmitting calibration source is reflected back by the retroreflector and then focused onto the receiving fiber by the receiving collimation optics. Due to the existing divergence or convergence, the focal point of the light of the transmitting calibration source here lies in front of or behind the previously adjusted end facet of the receiving fiber in the z-direction. Thus a non-optimum coupling of the light of the transmitting calibration source into the receiving fiber takes place, whereby a smaller power is detected by the detector. In the case of an optimum distance between the end facet of the transmitting fiber and the corresponding transmitting collimation optics the light of the transmitting calibration source is optimally calibrated, whereby an optimum coupling into the receiving fiber is also ensured. Thereby, the power of the light of the transmitting calibration source received by the detector is maximized. Thus the distance between the transmitting fiber and the corresponding transmitting collimation optics is adjusted on the basis of the power of the light of the transmitting calibration source received by the detector.

Preferably, a point-ahead angle mirror (PAAM) or point-ahead mirror is provided in the beam path of the transmitting laser. Thereby, it is possible, due to the propagation time of the optical data signal from the transmitter to the receiver over large distances and the resulting movement of the transmitter relative to the receiver, to perform a compensation with the aid of a point-ahead angle such that it is possible to simultaneously transmit and receive. For this purpose, the point-ahead mirror is in particular exclusively provided in the beam path of the transmitting laser, i.e. the transmitting path, such that an independent control of the beam path of the received optical data signal and the beam path of the transmitted optical data signal is possible.

Preferably, a point-ahead angle mirror (PAAM) or point-ahead mirror is provided in the beam path of the transmitting laser. This point-ahead mirror can vary the angle of the transmitting beam and thus the relative angle between the transmitting beam and the receiving beam in particular in 2 axes. Light of the transmitting calibration source which is reflected back by the retroreflector also travels to the four-quadrant sensor. Here, the measured position on the four-quadrant sensor depends on the lateral relative offset between the end facet of the transmitting fiber and the sensor center of the four-quadrant sensor. Thus the angle error between the transmitting and the receiving path can be completely compensated for by deflection of the point-ahead mirror after a previous adjustment of the receiving path. During operation an additional point-ahead angle for an adjustment-dependent deflection of the point-ahead mirror can be added. The point-ahead mirror can thus be used for compensating for an angle error between the transmitting path and the receiving path and simultaneously ensuring a point-ahead angle during operation for taking into account the propagation time of the optical data signal from the transmitter to the receiver.

In particular, for adjusting the transmitting path the light of the receiving calibration source can be turned off such that the measurement of the four-quadrant sensor is not affected in any way.

Preferably, the input optics is a telescope.

Preferably, an adaptive optics which is in particular configured as a deformable mirror (DM) is provided in the beam path for adaptation of the wave front interferences during the transfer.

Preferably, a wave front sensor is provided which is in particular connected to the adaptive optics such that the wave front interference detected by the wave front sensor can be compensated for by the adaptive optics.

In addition, a phase calibration source is provided which is in particular coupled into the beam path via a tip/tilt mirror. The light of the phase calibration source is then received by the wave front sensor, whereby the influence matrix can be determined which is in particular used for the control of the adaptive optics. This is possible since the light of the phase calibration source firstly does not have any phase interference and thus the influence of the setup on the phase interference can be determined at the wave front sensor.

Preferably, the receiving calibration source, the transmitting calibration source and the phase calibration source are lasers, wherein in particular the receiving calibration source and the transmitting calibration source and particularly preferably also the phase calibration source have different wavelengths.

In addition, the disclosure relates to a data transfer system for transferring an optical data signal from a transmitter to a receiver, wherein the transmitter and/or the receiver are configured in accordance with the setup described above.

Preferably, the data transfer system is a satellite uplink, wherein the receiver is in particular a satellite in a geostationary orbit, for example, and the transmitter is a transmitter located near the earth or stationarily on the ground. Of course, the positions of the receiver and the transmitter can be vice versa. However, it is preferred that the transmitter and the receiver are configured as bidirectional transmitter and receiver.

In addition, the disclosure relates to a method for adjusting a setup for receiving and/or transmitting an optical data signal, which is a setup as described above. For adjusting the receiving path of the setup, firstly, the retroreflector is inserted into the beam path. Then the light of the receiving calibration source is transmitted and reflected back to the detector by the retroreflector. Here, the distance of the end facet of the fiber to the receiving collimation optics is adapted until the power of the received light of the receiving calibration source detected by the detector is at its maximum. Thus the optimum distance of the end facet of the receiving fiber to the receiving collimation optics is detected.

Preferably, the four-quadrant sensor is then displaced in a plane perpendicular to the optical axis until the portion reflected back to the four-quadrant sensor by the retroreflector lies centrally on the four-quadrant sensor. Thereby, optimum pointing of the four-quadrant sensor relative to the end facet of the receiving fiber is achieved. Finally, the retroreflector is removed from the beam path and an optical data signal is received by the fiber-based detector. Thus the provided insertable retroreflector and the four-quadrant sensor allow for a reliable adjustment of the setup for receiving an optical signal in a simple manner.

Preferably, before the adaptation of the position of the end facet of the receiving fiber in the lateral plane by means of the four-quadrant sensor another position sensor for detecting the position of the light reflected by the retroreflector is used. Thereby, firstly, the position is measured by the position sensor during the adjustment. During operation, this position serves as a reference for rough pointing.

Preferably, light is transmitted by the transmitting calibration source and reflected back by the retroreflector for the transmitting beam adjustment. Here, the distance between the end facet of the transmitting fiber and the collimation optics is adapted depending on the power of the received light of the transmitting calibration source detected by the detector. Thus the position along the optical axis of the transmitting fiber can also be adjusted relative to the corresponding transmitting collimation optics by means of the detector. Provision of another detector is not necessary. The detector thus fulfills a double function and serves firstly for adjusting the receiving fiber and secondly for adjusting the transmitting fiber.

Preferably, the angle offset between the optical paths of the received optical data signal and the transmitted optical data signal is eliminated by means of a point-ahead mirror by an overlap of the signals reflected back by the retroreflector (56) on a four-quadrant sensor. The angle of the point-ahead mirror is thus varied such that it is also directed to the center of the four-quadrant sensor. If the lateral position of the four-quadrant sensor has previously been adapted to the lateral position of the end facet of the receiving fiber, the angle of the point-ahead mirror ensures that that no angle offset exists.

Preferably, the method is further developed on the basis of the features of the setup described above.

BRIEF DESCRIPTION OF THE DRAWINGS

Hereunder the disclosure will be described in detail on the basis of preferred embodiments with reference to the accompanying drawings in which.

DETAILED DESCRIPTION OF THE INVENTION

Figure 1:
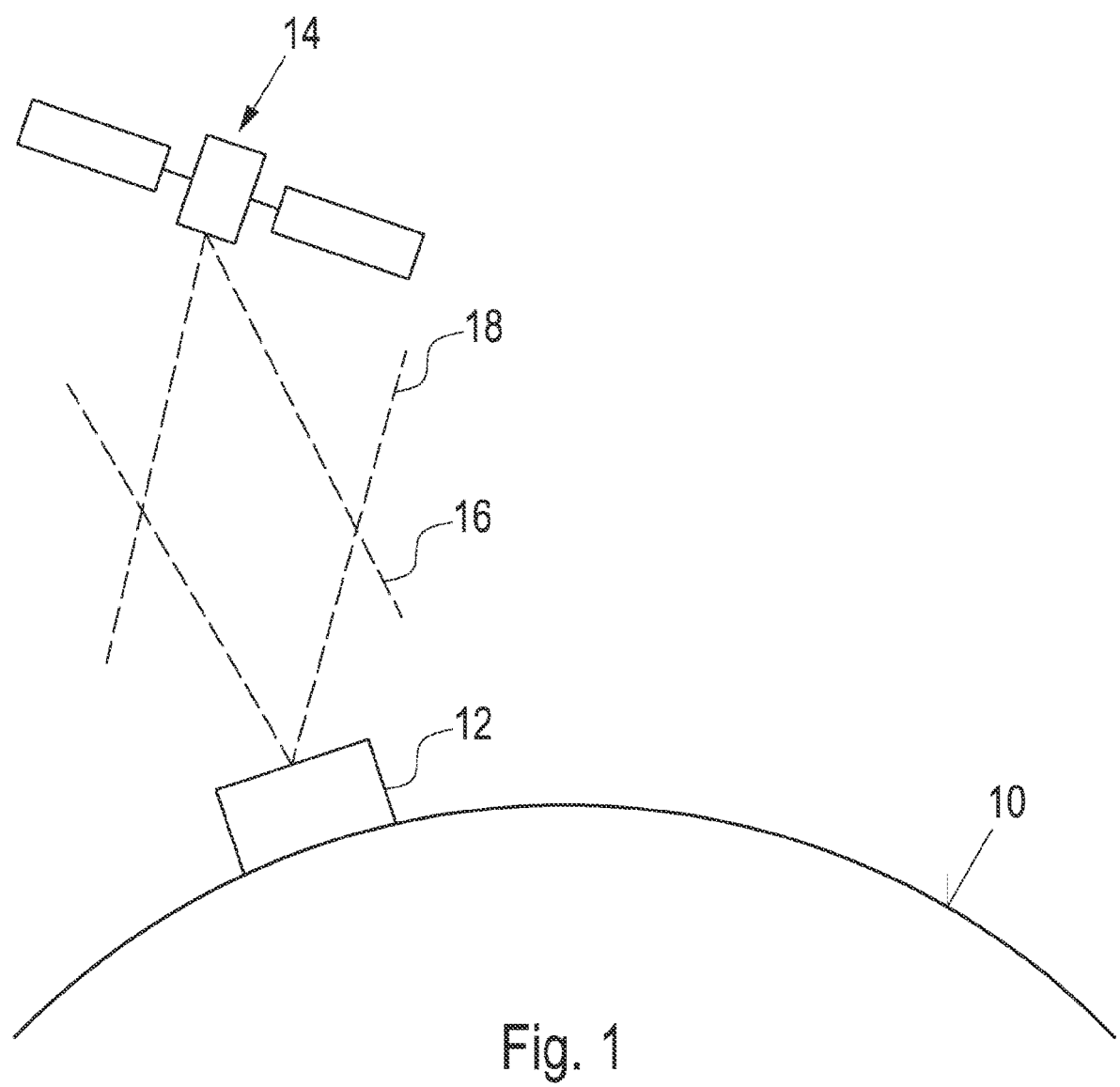
FIG. 1 shows a data transfer system according to the disclosure.

FIG. 1 shows the use of the setup according to the disclosure as a satellite uplink. For this purpose, a transmitter 12 is arranged on the surface 10 of the earth and a satellite 14 is illustrated as a receiver. Here, the transmitter and the receiver are in particular configured as bidirectional transmitter and receiver such that data can simultaneously be transmitted and received between the transmitter 12 and the receiver 14. Furthermore, the optical data signal 18 transmitted by the transmitter 12 is illustrated, which is divergent along the distance between the transmitter 12 and the receiver 14. Here, the aperture of the setup is small relative to the divergence such that essentially collimated light is received at the satellite. Furthermore, the satellite 14 can transmit an optical data signal 16, which is also divergent, to the transmitter 12.

The setup 20 according to the disclosure comprises an input optics 22 which is configured as a telescope. Here, the telescope comprises an aperture 24 which, as described above, is small as compared to the beam width such that essentially collimated light is received. The received optical data signal is deflected via a mirror 26 which is rapidly movable in two planes. These mirrors are also known as fast steering mirrors (FSM) or tip/tilt mirrors. Here, the tip/tilt mirror 26 compensates for an angle error of the received optical data signal. Then the received optical data signal is deflected via a deformable mirror 28 (DM) acting as an adaptive optics.

The received optical data signal is at least partially directed onto a detector 32 by a beam splitter 30. Here, the detector 32 is fiber-based. For coupling the received optical data signal into a receiving fiber 34 a receiving collimation optics 36 is provided which focuses the collimated optical data signal onto an end facet of the receiving fiber 34 and thereby couples it into the receiving fiber 34, whereby the optical data signal travels to the detector 32.

The portion of the received optical data signal not directed onto the detector 32 is focused onto a four-quadrant-detector 38 by means of a focusing lens 40. Here, the four-quadrant sensor 38 serves as a tracking sensor during operation in order to detect a relative positional change between the transmitter 12 and the receiver 14. Here, in particular the four-quadrant sensor 38 is connected to the tip/tilt mirror 26 via a negative feedback signal such that the tip/tilt mirror 26 is controlled via the measurement of the four-quadrant sensor 38. A relative positional change of the transmitter 12 and the receiver 14 with respect to each other can thus be compensated for by the tip/tilt mirror 26.

Between the four-quadrant sensor 38 and the beam splitter 30 another beam splitter 42 is arranged, whereby a portion of the received optical data signal is guided to a wave front sensor 44. The wave front sensor 44 allows phase interferences of the received data signal attributable to the atmosphere, for example, to be detected. In particular, the wave front sensor is configured as a Shack-Hartmann sensor. Here, the wave front sensor 44 is preferably connected to the deformable mirror 28 (not illustrated), wherein errors in the wave front can be compensated for by the deformable mirror 28.

Furthermore, a transmitting laser 46 is provided which is also fiber-bound to a transmitting fiber 48. The light of the transmitting laser 46 leaving the sensor fiber 48 is collimated by means of a transmitting collimation optics 50. The thus collimated optical data signal is deflected by a point-ahead mirror 52 and superimposed by the beam path of the received optical signal with the aid of another beam splitter 54. Here, the superposition can be effected in particular depending on the wavelength and/or the polarization. Here, the point-ahead mirror is configured for compensating for a position offset due to the propagation time of the optical data signal. Thereby, it is possible to transmit a received optical data signal and a transmitted optical data signal in a slightly offset manner for taking into account the propagation time of the transmitted optical data signal. Behind the beam splitter 54, by means of which the transmitted data signal is integrated into the beam path of the received data signal, the optical data signal to be transmitted is then transmitted to the receiver via the deformable mirror 28 and the tip/tilt mirror 26 by means of the telescope acting as the input optics 22.

For calibrating the setup 20, a retroreflector 56 is inserted into the beam path. Here, the retroreflector 56 reflects the incoming light back in the same direction. A receiving calibration source 60 which is configured as a laser, for example, is connected to the receiving fiber 34 via a circulator 58. Light of the receiving calibration source is transmitted by means of the receiving fiber 34, then collimated by the receiving collimation optics 36 and directed to the retroreflector via the beam splitter 30. The retroreflector reflects the light of the receiving calibration source 60 back, and the light travels to the end facet of the receiving fiber 34 via the receiving collimation optics 36. If the distance between the receiving collimation optics 36 and the end facet of the receiving fiber 34 is not optimal, the light of the receiving calibration source coming from the receiving fiber 34 is not completely collimated and has a certain degree of divergence or convergence. This is not changed by the retroreflector 56 such that the light of the receiving calibration source 60 reflected back by the retroreflector 56 continues to have a certain degree of divergence or convergence. This slightly diverging or converging light travels to the receiving collimation optics 36 via the beam splitter 30. However, since this is not optimally and completely collimated light, the focal point generated by the collimation optics 36 lies in front of or behind the end facet of the receiving fiber 34 in the z-direction as indicated by arrow 62. Since the focal point generated by the collimation optics 36 does not lie directly on the end facet of the receiving fiber 34, only a reduced portion of the light of the receiving calibration source is coupled back into the receiving fiber 34 and then detected by the detector 32. For adjustment purposes, the distance between the end facet of the receiving fiber 34 and the collimation optics 36 is now adapted such that the power detected by the detector 32 is at its maximum.

A portion of the light of the receiving calibration source 60 reflected back by the retroreflector 56 passes through the beam splitter 30 and is focused onto a position sensor 69 by means of another beam splitter 64 and a corresponding focusing lens 66. Here, the position sensor 69 has a smaller resolution than the four-quadrant sensor 38. However, the surface of the position sensor 69 can be larger such that during operation the focal point of the input signal is easy to find on the position sensor 69. Then, for adjustment purposes, the position offset of the position sensor 69 caused by the malpositioning of the focal point 70 is stored. This position information is used for rough pointing during operation. Then a fine adjustment by means of the four-quadrant-sensor 38 having a considerably larger resolution can be performed. Thus, by means of the detector 32 and the position sensor 69 or the four-quadrant sensor 38 an optimum adjustment of the in-coupling into the receiving fiber 34 can be reliably achieved.

Moreover, a transmitting calibration source 72 is provided which is configured as a separate light source in the present example. The light of the transmitting calibration source 72 is coupled into the transmitting fiber 48 via a high-power switch 74. The light of the transmitting calibration source travels to the retroreflector 56 via the corresponding transmitting collimation optics 50 and the point-ahead mirror 52, the beam splitter 54 and the deformable mirror 28 and is then reflected back. The light of the transmitting calibration source 72 reflected back by the retroreflector 56 is then directed to the detector 32 via the beam splitter 30 and the receiving fiber 34. Then the distance of the end facet of the transmitting fiber 48 to the corresponding collimation optics 50 along the optical axis 76 is adapted on the basis of the power detected by the detector 32 such that said power is at its maximum.

The light of the transmitting calibration source 72 reflected back by the retroreflector 56 is directed, in the same manner as described above for the light of the receiving calibration source, to the position sensor 69 for rough adjustment and then to the four-quadrant sensor 38 for fine adjustment, wherein the angle error between the beam paths of the received optical data signal and the transmitted optical data signal is compensated for using the point-ahead mirror.

Finally, the retroreflector is removed from the beam path. The thus completely adjusted setup 20 can now transmit and receive optical data signals during operation.

Figure 2:
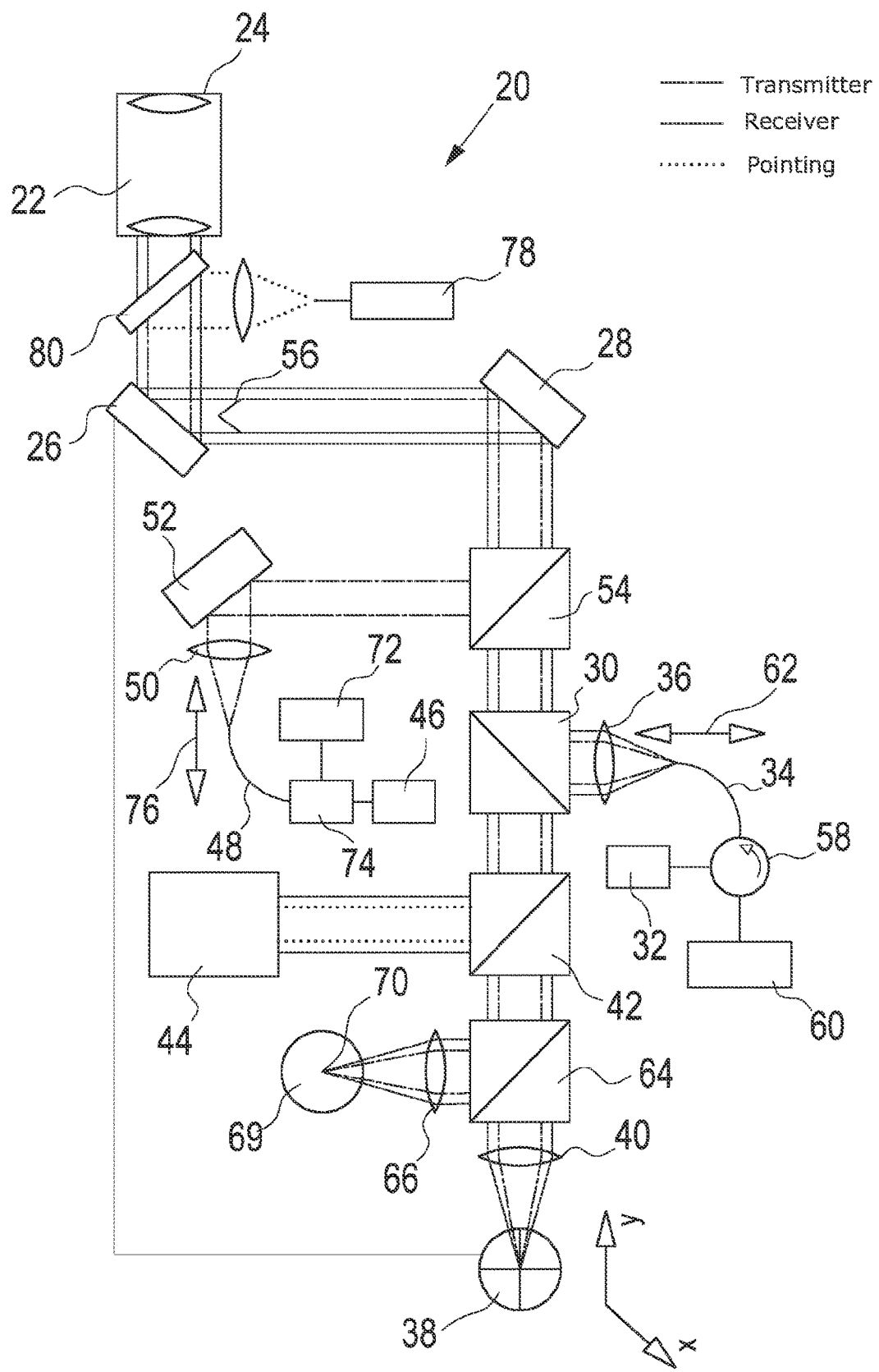
FIG. 2 shows a detailed view of the setup according to the disclosure for transmitting and receiving an optical data signal.

In addition, in the exemplary embodiment of FIG. 2, a phase calibration source 78 is provided, wherein the light of the phase calibration source 78 is coupled into the beam path by means of a foldable mirror 80. The light of the phase calibration source is directed to the wave front sensor 44 by the beam splitter 42. Thereby, it is possible to determine the influence matrix of the present setup 20 since the light of the phase calibration source 78 has no phase interferences and the interferences of the wave front determined by the wave front sensor 44 are exclusively attributable to interferences of the setup itself.

The method for adjusting the setup 20 thus comprises the following steps:
1. Inserting the retroreflector 56,
2. Adapting the distance between the end facet of the receiving fiber 34 and the receiving collimation optics 36 in the z-direction 62 until the power detected by the detector 32 is at its maximum, and
3. Adapting the lateral position of the four-quadrant-sensor 38.
4. Adapting the distance between the end facet of the transmitting fiber 48 and the corresponding collimation optics 50 depending on the power detected by the detector 32. Here, the light of the receiving collimation source can be turned off for preventing the adjustment steps from affecting each other.
5. Adapting the transmitting angle of the collimated transmitting path by means of the point-ahead mirror 52 on the basis of the position sensor 69 and the four-quadrant sensor 38.
6. Removing the retroreflector 56.
7. Determining the influence matrix by means of the phase calibration source 78 and the wave front sensor 44.

The invention claimed is:
1. A setup for receiving an optical data signal, comprising an input optics for receiving the optical data signal,
an optical receiving fiber comprising an end facet, wherein the optical data signal is configured to be coupled into the optical receiving fiber by means of a collimation optics, wherein a detector is connected to the optical receiving fiber for detecting the optical data signal,
a receiving calibration source, wherein the receiving calibration source is connected in a fiber-based manner to the optical receiving fiber by means of a circulator, and
a retroreflector configured to be inserted into a beam path, the retroreflector being inserted into the beam path for adjusting purposes such that a light of the receiving calibration source is reflected back and focused onto the end facet of the receiving fiber by means of the collimation optics,
wherein a distance in the z-direction between the collimation optics and the end facet of the receiving fiber is variable,
wherein the distance is adaptable depending on a power of the light of the receiving calibration source detected by the detector such that a collimated beam is obtained for obtaining the maximum possible in-coupling efficiency during operation.

2. The setup according to claim 1, wherein a four-quadrant-sensor is provided, wherein during adjustment, with the retroreflector inserted into the beam path, the light of the receiving calibration source is focused onto the four-quadrant sensor by means of an optics, wherein the four-quadrant sensor is movable in a plane perpendicular to an optical axis, wherein the four-quadrant sensor is movable depending on the measurement of the four-quadrant sensor, such that a relative lateral offset between the four-quadrant sensors and the end facet of the receiving fiber can be compensated for.

3. The setup according to claim 1, wherein a position sensor is provided, wherein during adjustment, with the retroreflector inserted into the beam path, the light of the receiving calibration source is focused onto the position sensor by means of an optics for determining a lateral position of the end facet of the receiving fiber relative to the position sensor for rough pointing.

4. The setup according to claim 1, wherein a transmitting laser is provided for bidirectional transmitting and receiving of the optical data signal, wherein the transmitting laser is connected to an optical transmitting fiber.

5. The setup according to claim 4, wherein a fiber-based transmitting calibration source is provided for calibrating an overlap between a plurality of optical paths of the received optical data signal and the transmitted optical data signal, wherein a light of the transmitting calibration source is reflected at the retroreflector and detected by the detector, wherein a transmitting calibration source is connected to the transmitting fiber, and wherein a distance between an end facet of the transmitting fiber and a transmitting collimation optics for coupling the optical data signal of the transmitting laser out of the transmitting laser is variable, wherein the distance is adapted depending on the power detected by the detector such that a refraction-limited collimated transmitting beam is obtained.

6. The setup according to claim 4, wherein the beam path of the transmitting laser a point-ahead mirror is provided, wherein a point-ahead value of the point-ahead mirror is adaptable depending on a measurement of the four-quadrant sensor for generating an overlap and avoiding an angle offset between the plurality of optical paths of the received optical data signal and the transmitted optical data signal.

7. The setup according to claim 6, wherein an adaptive optics is provided in the beam path for adaption of a wave front interface during the transmission.

8. The setup according to claim 7, wherein a wave front sensor is provided, wherein the wave front sensor is connected to the adaptive optics such that the wave front interference detected by the wave front sensor is compensated for by the adaptive optics.

9. The setup according to claim 8, wherein a phase calibration source is provided which is coupled with the beam path by a foldable mirror such that a phase interference of the setup is detectable by means of the wave front sensor and an influence matrix in the system can be measured.

10. A data transfer system for transferring an optical data signal from a transmitter to a receiver, wherein the transmitter and/or the receiver are configured in accordance with the setup according to claim 1.

11. The data transfer system according to claim 10, wherein it is a satellite uplink and the receiver is a satellite in a geostationary orbit and the transmitter is a transmitter located near Earth or stationarily on ground.

12. A method for adjusting a setup for receiving and/or transmitting an optical data signal with a setup according to claim 1, wherein a) the retroreflector is inserted into the beam path;

b) the light of the receiving calibration source is transmitted and reflected back to the detector by the retroreflector;

c) a distance of the end facet of the receiving fiber to the collimation optics is adapted until the power of the light of the receiving calibration source detected by the detector is at its maximum, and d) the reflector of the beam path is removed and an optical data signal is received by the detector.

13. The method according to claim 12, wherein before step d) a lateral position of a four-quadrant sensor is adapted to the position of a light reflected back by the retroreflector.

14. The method according to claim 12, wherein a light is transmitted by the transmitting calibration source and reflected back to the detector by the retroreflector, wherein the distance between the end facet of the transmitting fiber and the collimation optics is adapted depending on a power of a received light transmitted by the transmitting calibration source detected by the detector such that a refraction-limited transmitting beam is obtained.

15. The method according to claim 14, wherein, by means of a point-ahead mirror, an angle offset between a plurality of optical paths of the received optical data signal and the transmitted optical data signal is eliminated due to an overlap of a plurality of signals reflected back by the retroreflector on a four-quadrant sensor.

* * * * *

UNITED STATES PATENT AND TRADEMARK OFFICE
CERTIFICATE OF CORRECTION

PATENT NO. : 11,405,106 B2
APPLICATION NO. : 17/421581
DATED : August 2, 2022
INVENTOR(S) : Rein et al.

Page 1 of 1

It is certified that error appears in the above-identified patent and that said Letters Patent is hereby corrected as shown below:

In the Claims

Column 11, Line 37, Claim 6, delete "wherein" and insert -- wherein in --

Column 11, Line 46, Claim 7, delete "interface" and insert -- interference --

Column 12, Line 29, Claim 12, delete "reflector" and insert -- retroreflector --

Signed and Sealed this
Fourth Day of October, 2022

Katherine Kelly Vidal
*Director of the United States Patent and Trademark Office*